(12) United States Patent
Dix et al.

(10) Patent No.: US 12,032,383 B2
(45) Date of Patent: Jul. 9, 2024

(54) LOCALIZED OBSTACLE AVOIDANCE FOR OPTIMAL V2V PATH PLANNING

(71) Applicant: CNH Industrial America LLC, New Holland, PA (US)

(72) Inventors: Phillip Duane Dix, Westmont, IL (US); Daniel Geiyer, Bolingbrook, IL (US); Aditya Singh, Bolingbrook, IL (US); Navneet Gulati, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 529 days.

(21) Appl. No.: 16/882,115

(22) Filed: May 22, 2020

(65) Prior Publication Data

US 2021/0365036 A1 Nov. 25, 2021

(51) Int. Cl.
*G05D 1/00* (2006.01)
*A01D 41/02* (2006.01)
*A01D 41/127* (2006.01)

(52) U.S. Cl.
CPC ........... *G05D 1/0238* (2013.01); *A01D 41/02* (2013.01); *A01D 41/1278* (2013.01); *G05D 1/0219* (2013.01); *G05D 1/0274* (2013.01)

(58) Field of Classification Search
CPC .. G05D 1/0238; G05D 1/0219; G05D 1/0274; G05D 2201/0201; G05D 1/0214; G05D 1/0289; G05D 1/0212; A01D 41/02; A01D 41/1278; G05B 2219/39087; G05B 2219/40474; G01C 21/3461; A01B 69/008

See application file for complete search history.

(56) References Cited

U.S. PATENT DOCUMENTS

| | | | |
|---|---|---|---|
| 7,079,943 B2 * | 7/2006 | Flann | B60K 6/48 701/25 |
| 7,193,559 B2 | 3/2007 | Ford et al. | |
| 7,454,290 B2 | 11/2008 | Alban et al. | |

(Continued)

FOREIGN PATENT DOCUMENTS

| CN | 106909144 A | 6/2017 |
|---|---|---|
| CN | 107817798 A | 3/2018 |

(Continued)

OTHER PUBLICATIONS

Jiang, et al, "A New Adaptive H-Infinity Filtering Algorithm for the GPS/INS Integrated Navigation", Sensors, Dec. 19, 2019, pp. 1-16, vol. 16.

(Continued)

*Primary Examiner* — Bao Long T Nguyen
(74) *Attorney, Agent, or Firm* — Rickard Demille; Rebecca Henkel; Peter Zacharias

(57) ABSTRACT

A vehicle control system for an agricultural vehicle, including a processing circuit including a processor and memory, the memory having instructions stored thereon that, when executed by the processor, cause the processing circuit to receive a location of a first vehicle, update a coverage map based on the location of the first vehicle, wherein the coverage map represents a region of operation for the agricultural vehicle and the first vehicle, designate one or more areas of the coverage map as repulsion areas based on the location of the first vehicle, and generate a path from the agricultural vehicle to the first vehicle based on the one or more repulsion areas.

11 Claims, 10 Drawing Sheets

(56) References Cited

U.S. PATENT DOCUMENTS

| | | |
|---|---|---|
| 9,340,211 B1 | 5/2016 | Singh |
| 9,625,911 B2 | 4/2017 | Lee |
| 9,711,050 B2 | 7/2017 | Ansari |
| 10,011,284 B2 | 7/2018 | Berntorp et al. |
| 10,247,816 B1 | 4/2019 | Hoffmann et al. |
| 10,338,223 B1 | 7/2019 | Englard et al. |
| 10,360,476 B2 | 7/2019 | Steinhardt et al. |
| 10,409,280 B2 | 9/2019 | Zhu |
| 10,438,493 B2 | 10/2019 | Bavar et al. |
| 10,442,439 B1 | 10/2019 | Seo et al. |
| 2007/0255498 A1 | 11/2007 | McDaniel et al. |
| 2010/0063651 A1 | 3/2010 | Anderson |
| 2013/0103249 A1* | 4/2013 | Pieper .................. G05D 1/0291 701/25 |
| 2013/0218396 A1 | 8/2013 | Moshchuk et al. |
| 2014/0277926 A1 | 9/2014 | Singh et al. |
| 2017/0118915 A1 | 5/2017 | Middelberg et al. |
| 2017/0145663 A1 | 5/2017 | Hiranaka |
| 2017/0276534 A1 | 9/2017 | Vermue et al. |
| 2017/0315549 A1 | 11/2017 | Oppolzer et al. |
| 2017/0351261 A1 | 12/2017 | Levinson et al. |
| 2017/0357267 A1 | 12/2017 | Foster et al. |
| 2018/0245922 A1 | 8/2018 | Zaphir et al. |
| 2018/0276832 A1 | 9/2018 | Aikin |
| 2019/0146511 A1 | 5/2019 | Hurd et al. |
| 2019/0239502 A1 | 8/2019 | Palomares et al. |
| 2019/0315343 A1 | 10/2019 | Steffey et al. |
| 2019/0325546 A1 | 10/2019 | Hagestad et al. |
| 2020/0117211 A1* | 4/2020 | Paglieroni ............ G05D 1/0259 |

FOREIGN PATENT DOCUMENTS

| | | |
|---|---|---|
| CN | 109471432 A | 3/2019 |
| CN | 109828589 A | 5/2019 |
| CN | 109901593 A | 6/2019 |
| EP | 3 318 422 A1 | 5/2018 |
| WO | WO-2017/079460 A2 | 5/2017 |

OTHER PUBLICATIONS

John Leonard et al. "A Perception-Driven Autonomous Urban Vehicle" Jan. 1, 2008.

Joseph Satoru Putney "Reactive Navigation of an Autonomous Ground Vehicle Using Dynamic Expanding Zone" May 11, 2006.

Kok, et al, "Using Inertial Sensors for Position and Orientation Estimation", Foundations and Trends in Signal Processing, 2017, pp. 1-89, vol. 11, No. 1-2.

* cited by examiner

LOCALIZED OBSTACLE AVOIDANCE FOR OPTIMAL V2V PATH PLANNING

BACKGROUND

The present disclosure relates generally to the field of vehicle path planning, and more particularly to a system and method for classifying objects and determining optimal vehicle routes.

SUMMARY

One implementation of the present disclosure is a vehicle control system for an agricultural vehicle, including a processing circuit including a processor and memory, the memory having instructions stored thereon that, when executed by the processor, cause the processing circuit to receive a location of a first vehicle, update a coverage map based on the location of the first vehicle, wherein the coverage map represents a region of operation for the agricultural vehicle and the first vehicle, designate one or more areas of the coverage map as repulsion areas based on the location of the first vehicle, and generate a path from the agricultural vehicle to the first vehicle based on the one or more repulsion areas, and wherein each repulsion area includes a gradient and wherein an object at a first distance from a center of the repulsion area experiences a first modeled force and wherein the object at a second distance closer than the first distance from the center of the repulsion area experiences a second modeled force that is greater than the first modeled force.

In some embodiments, the processing circuit is further configured to operate the agricultural vehicle based on the path. In some embodiments, the coverage map includes a path taken by the first vehicle and wherein the one or more repulsion areas are further designated based on the path taken by the first vehicle. In some embodiments, the region of operation is a farm field. In some embodiments, the path is generated to avoid the one or more repulsion areas. In some embodiments, the one or more repulsion areas represent obstacles. In some embodiments, generating the path further includes generating the path based on a location of the agricultural vehicle. In some embodiments, generating the path includes performing an operation with one or more vectors associated with the one or more repulsion areas. In some embodiments, generating the path further includes performing an operation using the first and second modeled forces. In some embodiments, the operation includes generating a path that attenuates a magnitude of the first and second modeled forces in real time.

Another implementation of the present disclosure is a method of obstacle avoidance for an agricultural vehicle, the method including receiving, by the agricultural vehicle, a coverage map representing a region of operation for the agricultural vehicle, receiving, by the agricultural vehicle, obstacle location data associated with one or more obstacles, classifying each of the one or more obstacles as a dynamic obstacle or a static obstacle, and generating for each of the one or more obstacles a repulsion area based on the obstacle classification, wherein the repulsion area includes a gradient and wherein an object at a first distance from a center of the repulsion area experiences a first modeled force and wherein the object at a second distance closer than the first distance from the center of the repulsion area experiences a second modeled force that is greater than the first modeled force.

In some embodiments, the method further includes performing a pathfinding operation using the one or more repulsion areas to determine a route for the agricultural vehicle. In some embodiments, the obstacle location data is received from one or more auxiliary vehicles. In some embodiments, the obstacle location data includes a position associated with the one or more auxiliary vehicles. In some embodiments, the auxiliary vehicles are classified as dynamic obstacles. In some embodiments, the static obstacles include crop, and wherein a repulsion area associated with the crop changes in response to the crop being harvested. In some embodiments, the gradient generates one or more vectors based on a location of the agricultural vehicle, and wherein the one or more vectors are used in a pathfinding operation. In some embodiments, the method further includes updating the coverage map to include the one or more repulsion areas.

Another implementation of the present disclosure is a non-transitory computer-readable storage medium having instructions stored thereon that, when executed by a processor, cause the processor to receive, from a first vehicle, location information, update a coverage map representing a region of operation for the first vehicle based on the location information, generate one or more repulsion areas based on the updated coverage map, wherein each repulsion area includes a gradient and wherein an object at a first distance from a center of the repulsion area experiences a first modeled force and wherein the object at a second distance closer than the first distance from the center of the repulsion area experiences a second modeled force that is greater than the first modeled force, and generate a path to the first vehicle based on the one or more repulsion areas.

In some embodiments, generating the path to the first vehicle includes minimizing a parameter associated with the one or more repulsion areas such that the path avoids the one or more repulsion areas.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Referring generally to the FIGURES, described herein are systems and methods of a vehicle control system. In various embodiments, the vehicle control system classifies obstacles and generates an optimal path to a destination while avoiding the obstacles. For example, in an agricultural context, a hauling vehicle (e.g., a tractor-trailer, etc.) may determine a route to a harvesting vehicle (e.g., a combine harvester, etc.) while avoiding obstacles such as unharvested crop, trees, other vehicles, and the like. In various embodiments, the vehicle control system receives input from one or more sources. For example, the vehicle control system may receive geospatial data (e.g., a coverage map, etc.) from other vehicles. In some embodiments, the vehicle control system determines the presence of obstacles and/or classifies obstacles based on the input. For example, the vehicle control system may classify a harvesting vehicle as a dynamic obstacle and may classify unharvested crop as a static obstacle based on geospatial data received from the harvesting vehicle. In various embodiments, the vehicle control system models a repulsive field associated with the identified obstacles. For example, a vehicle control system associated with a first vehicle may model both the first vehicle and an obstacle as a positive magnetic monopole, thereby generating a modeled repulsive force between the first vehicle and the obstacle that may be used to facilitate obstacle avoidance (e.g., because the first vehicle and the obstacle have a modeled repulsion from one another). In various embodiments, the vehicle control system uses the modeled repulsive field to facilitate path planning. For example, the vehicle control system may determine the shortest route from an origin to a destination while minimizing the magnitude of the modeled repulsive force experienced by a vehicle associated with the vehicle control system.

Figure 1:
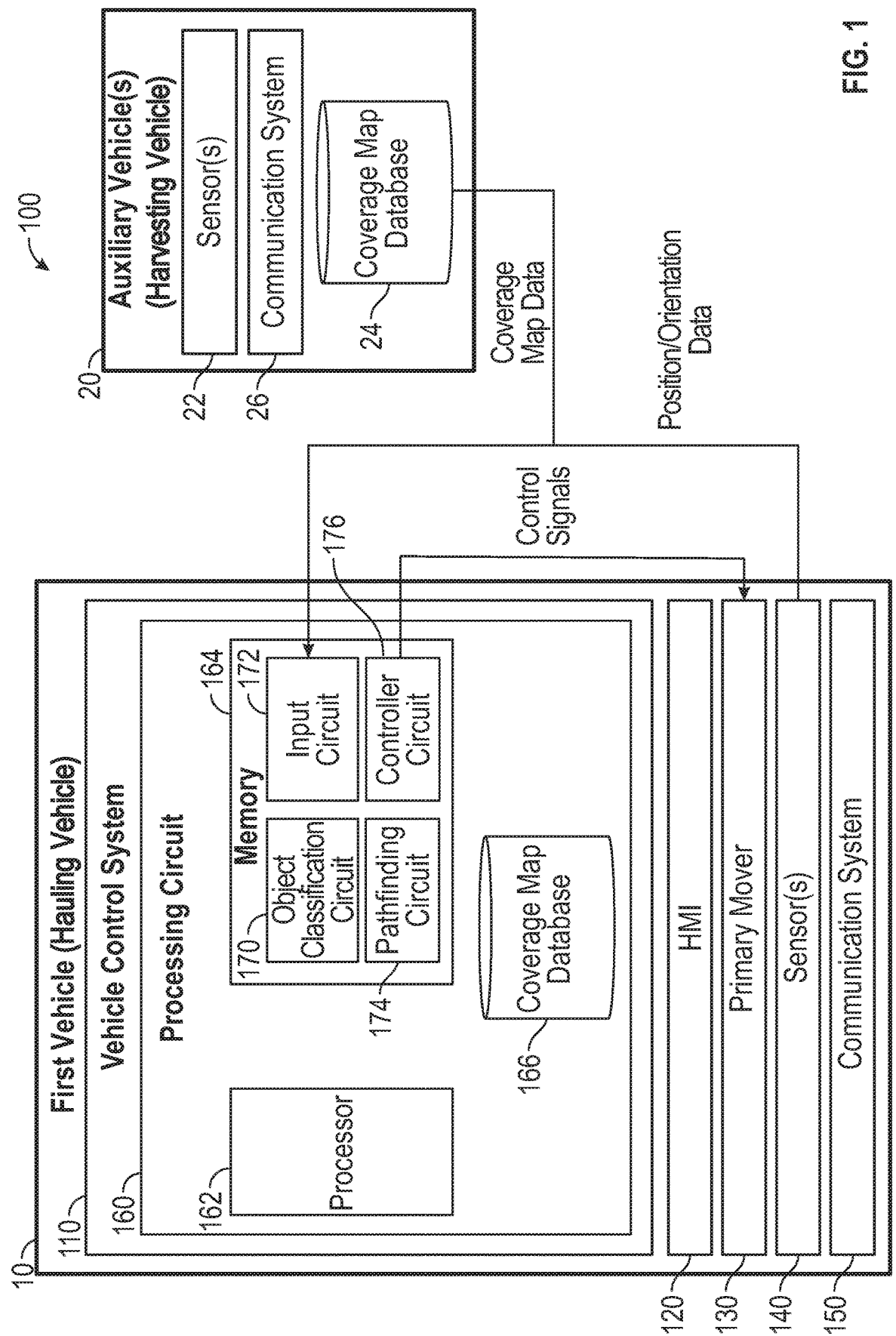
FIG. 1 is a block diagram of a vehicle having a vehicle control system, according to an exemplary embodiment.

Hereinafter, example embodiments will be described in more detail with reference to the accompanying drawings. Referring now to FIG. 1, a block diagram of a control environment 100 is shown, according to an exemplary embodiment. Control environment 100 is shown to include first vehicle (hauling vehicle) 10 and auxiliary vehicle(s) (harvesting vehicle) 20. In various embodiments, hauling vehicle 10 and harvesting vehicle 20 are agricultural vehicles. For example, hauling vehicle 10 may be a hauling vehicle (e.g., a tractor-trailer, etc.) and harvesting vehicle 20 may be or include harvesting vehicles (e.g., a combine harvester, etc.). In some embodiments, each of harvesting vehicles 20 are the same or a similar type of vehicle (e.g., a number of combine harvesters, etc.). Additionally or alternatively, harvesting vehicle 20 may be or include a number of different types of vehicles. For example, harvesting vehicle 20 may include a first utility vehicle (e.g., a truck such as a Class 1 light pickup truck, etc.), a second and third hauling vehicle, and a fourth irrigation vehicle (e.g., a linear move irrigation system, etc.). In various embodiments, hauling vehicle 10 is associated with one or more of harvesting vehicles 20. For example, a first harvesting vehicle 20 may be a leader vehicle and hauling vehicle 10 may be a follower vehicle configured to communicate with the first harvesting vehicle 20 via a vehicular communication system. While the vehicle control system of the present disclosure is described in relation to agricultural vehicles, it should be understood that the vehicle control system is usable with other vehicles (e.g., non-agricultural vehicles) and that such embodiments are within the scope of the present disclosure. As a non-limiting example, in a landscaping context, hauling vehicle 10 may be a lawn mower and harvesting vehicle 20 may include golf carts. As another non-limiting example, in a snow-clearing context, hauling vehicle 10 may be a winter service vehicle including a snowplow and harvesting vehicle 20 may include motor vehicles (e.g., automobiles, etc.). As another non-limiting example, in a construction context, hauling vehicle 10 may be a dump truck and harvesting vehicle 20 may include an excavation vehicle such as a bulldozer, loader (e.g., front loader, backhoe loader, track loader, etc.), power shovel, front shovel, and/or the like. In various embodiments, harvesting vehicle 20 may be one of various other construction related vehicles. For example, a first hauling vehicle 10 may be a dump truck and a first harvesting vehicle 20 may be a paving machine (e.g., an asphalt paver, etc.), where the dump truck is configured to determine an optimal route to supply the paving machine with paving materials while avoiding collisions with obstacles. In various embodiments, constructions vehicles may be equipped with vehicle control system 110 to facilitate obstacle avoidance. For example, numerous hauling vehicles 10 (e.g., dump trucks, etc.) may be configured to share coverage map data to facilitate obstacle avoidance on a job site. Additionally or alternatively, construction vehicles may be equipped with vehicle control system 110 to facilitate route determination and/or path planning. For example, a dump truck associated with an excavator may be equipped with vehicle control system 110 to facilitate path planning and obstacle avoidance while traveling between the excavator and a dump site.

Hauling vehicle 10 includes vehicle control system 110, human-machine interface (HMI) 120, primary mover 130, sensor(s) 140, and communication system 150. Vehicle control system 110 may perform the obstacle classification and path planning described herein. In various embodiments, vehicle control system 110 is physically located with hauling vehicle 10. For example, vehicle control system 110 may be or include a hardware component installed in hauling vehicle 10. Additionally or alternatively, part or all of vehicle control system 110 may be located separately of hauling vehicle 10. For example, vehicle control system 110 may be or include a remote processing system (e.g., a server, two or more computing systems/servers in a distributed computing implementation, a cloud-based processing system, etc.) configured to receive input from control environment 100 and control hauling vehicle 10 remotely.

HMI 120 may facilitate user interaction with hauling vehicle 10 and/or vehicle control system 110. HMI 120 may include elements configured to present information to a user and receive user input. For example, HMI 120 may include a display device (e.g., a graphical display, a touchscreen, etc.), an audio device (e.g., a speaker, etc.), manual controls (e.g., manual steering control, manual transmission control, manual braking control, etc.), and/or the like. HMI 120 may include hardware and/or software components. For example, HMI 120 may include a microphone configured to receive user voice input and a software component configured to control hauling vehicle 10 based on the received user voice input. In various embodiments, HMI 120 presents information associated with the operation of hauling vehicle 10 and/or vehicle control system 110 to a user and facilitates user control of operating parameters. For example, HMI 120 may display operational parameters (e.g., fuel level, seed level, penetration depth of ground engaging tools, guidance swath, etc.) on a touchscreen display and receive user control input via the touchscreen display.

Primary mover 130 may generate mechanical energy to operate hauling vehicle 10. For example, primary mover 130 may be or include an internal combustion engine. Additionally or alternatively, primary mover 130 may be or include an electric motor. In various embodiments, primary mover 130 is coupled to a frame of hauling vehicle 10 and configured to provide power to a plurality of tractive elements (e.g. wheels, etc.). In various embodiments, primary mover 130 utilizes one or more fuels and/or energy storage systems (e.g., rechargeable batteries, etc.). For example, primary mover 130 may utilize diesel, gasoline, propane, natural gas, hydrogen, lithium-ion batteries, nickel-metal hydride batteries, lithium-ion polymer batteries, lead-acid batteries, nickel-cadmium batteries, and/or the like.

Sensor(s) 140 may monitor one or more parameters associated with hauling vehicle 10. For example, sensor(s) 140 may monitor operation of primary mover 130 (e.g., torque, temperature, fuel level, airflow, etc.). Additionally or alternatively, sensor(s) 140 may monitor an environment of hauling vehicle 10. For example, sensor(s) 140 may include cameras to view the surroundings of hauling vehicle 10 and perform object recognition to facilitate obstacle avoidance. Sensor(s) 140 may include engine sensors, transmission sensors, chassis sensors, safety sensors, driver assistance sensors, passenger comfort sensors, entertainment systems sensors, and/or the like. In various embodiments, sensor(s) 140 monitor geospatial parameters associated with hauling vehicle 10. For example, sensor(s) 140 may include a geolocation sensor (e.g., a GPS receiver, satellite navigation transceiver, etc.) configured to monitor a position of hauling vehicle 10 (e.g., provide geolocation and/or time information, etc.). Sensor(s) 140 may measure an absolute position of hauling vehicle 10 (e.g., a location, etc.), a relative position of hauling vehicle 10 (e.g., a displacement, a linear travel, a rotational angle, etc.), and/or a three-dimensional position of hauling vehicle 10. In some embodiments, sensor(s) 140 receive input from external sources. For example, sensor(s) 140 may include position sensors configured to communicate with one or more beacons located throughout a farm field to determine a location of hauling vehicle 10. In various embodiments, sensor(s) 140 are physically located with hauling vehicle 10. For example, sensor(s) 140 may include a chassis mounted infra-red sensor configured to measure crop health. Additionally or alternatively, sensor(s) 140 may be located separately of hauling vehicle 10. For example, sensor(s) 140 may include a nitrogen sensor configured to measure soil nitrogen remotely of hauling vehicle 10. Sensor(s) 140 may include hardware and/or software components. For example, sensor(s) 140 may include a GPS receiver configured to receive positional data and a software component configured to determine positional parameters associated with hauling vehicle 10 (e.g., pose, speed, yaw, trajectory, etc.) based on the positional data. As another example, sensor(s) 140 may include an optical device (e.g., a camera, LIDAR sensor, etc.) configured to capture image data and a software component configured to classify obstacles based on the image data.

Communication system 150 may facilitate communication between hauling vehicle 10 and/or vehicle control system 110 and external systems (e.g., harvesting vehicle 20, etc.). Communication system 150 may be or include wired or wireless communications interfaces (e.g., jacks, antennas, transmitters, receivers, transceivers, wire terminals, etc.) for conducting data communications within control environment 100 and/or with other external systems or devices. In various embodiments, communications via communication system 150 is direct (e.g., local wired or wireless communications). Additionally or alternatively, communications via communication system 150 may utilize a network (e.g., a WAN, the Internet, a cellular network, a vehicle-to-vehicle network, etc.). For example, vehicle control system 110 may communicate with a decision support system (DSS) using a 4G and/or 5G connection (e.g., via a 4G or 5G access point/small cell base station, etc.) and may communicate with harvesting vehicle 20 using a dedicated short-range communication channel (e.g., a vehicular ad-hoc network, etc.). In some embodiments, communication system 150 facilitates vehicle-to-vehicle (V2V) and/or vehicle-to-everything (V2X) communication. For example, communication system 150 may facilitate communication between hauling vehicle 10 and harvesting vehicle 20 using the IEEE 802.11p standard (e.g., a wireless access in vehicular environments (WAVE) vehicular communication system). In some embodiments, hauling vehicle 10 communicates with harvesting vehicle 20 via Wi-Fi.

Referring now generally to vehicle control system 110, vehicle control system 110 offers many benefits over existing systems. Conventional obstacle avoidance and path planning systems typically include an obstacle classification means integrally coupled to a pathfinding means. Specifically, in conventional systems the pathfinding means are typically limited to a particular obstacle classification means. For example, a conventional system may include a pathfinding system that is dependent on an associated obstacle classifier such that the pathfinding system cannot function with other obstacle classifiers. However, vehicle control system 110 described herein facilitates a decoupled pathfinding means. That is, the obstacle classification of vehicle control system 110 may be used with many different pathfinding systems, thereby facilitating flexibility in which pathfinding system is used. For example, in a commercial orchard context, a first pathfinding system may be used that is optimized for precision within the rigid layout of the orchard. Further, in a grain harvesting context, a second pathfinding system may be used that is optimized for speed within the open layout of a farm field. Therefore, vehicle control system 110 enables vehicles to be used in multiple contexts without the downtime and costs associated with conventional systems that require reconfiguration (e.g., replacing sensors required by a first system with sensors required by a second system, etc.). Furthermore, conventional systems typically include complex object classification systems that require a large amount of computing power. For example, a conventional system may include a large database of classifications and may compare an identified object against the database to determine how to treat the object (e.g., what type of obstacle the object is, etc.), thus requiring constant updates to the database (e.g., to capture the full range of possible objects, etc.) and a large computing overhead to perform the comparisons. However, vehicle control system 110 simplifies object classification by reducing classification to a binary (e.g., a dynamic obstacle or a static obstacle), thereby improving existing technology by reducing the amount of computing power and updates required (e.g., because there is no need to maintain a classification database, etc.). Furthermore, vehicle control system 110 facilitates seamless integration with other systems. For example, vehicle control system 110 may be augmented with a vision system to identify new obstacles without requiring complicated reworking of the obstacle classifier as in conventional systems.

In various embodiments, vehicle control system 110 offers benefits over existing path planning systems. Conventional path planning systems may track the movements and planned routes of obstacles in a region and determine an optimal path to a destination based on the movements and planned routes of the obstacles. Determining an optimal path based on the movements and planned routes of multiple obstacles currently requires a large amount of computing power and time, thereby rendering such systems expensive and slow to respond to changes (e.g., a new unplanned route of an obstacle, etc.). However, vehicle control system 110 dynamically determines a route based on an attraction/repulsion mechanic that greatly reduces the amount of computing power required, thereby reducing the costs of the system and facilitating faster computation times and therefore increasing the responsiveness of the system to change. Furthermore, unlike conventional systems, vehicle control system 110 does not require a priori knowledge of the planned paths of obstacles, therefore vehicle control system 110 is robust against uncertainties in obstacle motion. For example, in a conventional system, if an obstacle indicates an initial planned path to a vehicle that is used to plan the vehicle motion and the obstacle deviates from the initial planned path, then the vehicle may collide with the obstacle. However, vehicle control system 110 may dynamically adjust vehicle motion to account for changes in obstacle motion based on an attraction/repulsion mechanic as described in detail below.

Referring still to FIG. 1, vehicle control system 110 is shown to include processing circuit 160 having processor 162, memory 164, and coverage map database 166. In some embodiments, vehicle control system 110 includes one or more processing circuits 160 including one or more processors 162 and one or more memories 164. Each of processors 162 can be a general purpose or specific purpose processor, an application specific integrated circuit (ASIC), one or more field programmable gate arrays (FPGAs), a group of processing components, or other suitable processing components. Each of processors 162 is configured to execute computer code or instructions stored in memory 164 or received from other computer readable media (e.g., CDROM, network storage, a remote server, etc.).

Memory 164 may include one or more devices (e.g., memory units, memory devices, storage devices, or other computer-readable media) for storing data and/or computer code for completing and/or facilitating the various processes described in the present disclosure. Memory 164 may include random access memory (RAM), read-only memory (ROM), hard drive storage, temporary storage, non-volatile memory, flash memory, optical memory, or any other suitable memory for storing software objects and/or computer instructions. Memory 164 may include database components, object code components, script components, or any other type of information structure for supporting the various activities and information structures described in the present disclosure. Memory 164 may be communicably connected to processor(s) 162 via processing circuit 160 and may include computer code for executing (e.g., by processor 162) one or more of the processes described herein.

Memory 164 is shown to include object classification circuit 170, input circuit 172, pathfinding circuit 174, and controller circuit 176. Object classification circuit 170 may classify objects into various types of obstacles. In various embodiments, object classification circuit 170 classifies objects as static obstacles or dynamic obstacles. Static obstacles may include stationary or fixed objects such as trees, rocks, culverts, crop, buildings, and the like. Dynamic obstacles may include moving or movable objects such as people, vehicles (e.g., harvesting vehicle 20, etc.), animals, drones, non-fixed objects (e.g., blowing debris, etc.), and the like. In various embodiments, object classification circuit 170 receives obstacle information from external sources (e.g., via input circuit 172, etc.) and classifies objects into static obstacles and dynamic obstacles based on the obstacle information. For example, object classification circuit 170 may receive position information from a first harvesting vehicle 20 and classify the first harvesting vehicle 20 as a dynamic obstacle. As a further example, object classification circuit 170 may receive a coverage map from a second harvesting vehicle 20 and classify a region of crop included in the coverage map as a static obstacle. In some embodiments, object classification circuit 170 receives object classification information. For example, object classification circuit 170 may receive position data and object classification information from a tractor specifying a position of the tractor and that the tractor is a dynamic obstacle. Additionally or alternatively, object classification circuit 170 may determine a classification based on a source of received data. For example, object classification circuit 170 may classify any object that transmits its location as a dynamic obstacle.

In various embodiments, object classification circuit 170 generates a repulsive field for obstacles. In some embodiments, object classification circuit 170 may generate the repulsive field based on the type of obstacle (e.g., static vs. dynamic, etc.). In various embodiments, the repulsive fields are dynamic (e.g., change in response to various parameters, etc.). For example, a first repulsive field associated with a vehicle traveling at a first speed may be substantially circular while a second repulsive field associated with the vehicle traveling at a second speed greater than the first speed may be elongated in the direction of travel to be substantially oblong. In various embodiments, object classification circuit 170 generates different repulsive fields based on characteristics of the obstacle. For example, a first repulsive field for a hauling vehicle may be substantially rectangular in shape while a second repulsive field for a harvesting vehicle may be substantially ovoid in shape. Additionally or alternatively, object classification circuit 170 may generate different repulsive fields based on characteristics of hauling vehicle 10. For example, a large hauling vehicle 10 that requires more time than a small hauling vehicle 10 to change speed and/or direction may require larger repulsive fields than the small hauling vehicle 10. The term "repulsive field" as used herein may refer to a modeled field associated with obstacles that may be used for path planning and/or obstacle avoidance. The repulsive field may exert a modeled repulsive field force on a vehicle in the proximity. For example, a repulsive field associated with an obstacle may exert a small modeled repulsive force on a vehicle when the vehicle is a distance away from the obstacle and may exert a larger modeled repulsive force on the vehicle when the vehicle is a smaller distance away from the obstacle. The modeled repulsive field forces are not physically experienced by the vehicle, however may facilitate path planning and/or obstacle avoidance. Object classification and modeling repulsive fields are discussed in detail below with reference to FIGS. 2-5C.

Input circuit 172 may facilitate receiving and processing of information from external sources. For example, input circuit 172 may receive position and/or orientation data from sensor(s) 140. As a further example, input circuit 172 may receive coverage map data from harvesting vehicle 20. In various embodiments, input circuit 172 may modify existing models based on received information. For example, input circuit 172 may receive coverage map data from harvesting vehicle 20 and update a coverage map stored in coverage map database 166 based on the received coverage map data. In some embodiments, input circuit 172 facilitates integrating vehicle control system 110 with other systems. For example, input circuit 172 may receive obstacle data from a vision system and may format the obstacle data for object classification circuit 170.

Pathfinding circuit 174 may facilitate path planning. In various embodiments, pathfinding circuit 174 receives a position of hauling vehicle 10 from sensor(s) 140, a destination from communication system 150, and obstacle data from object classification circuit 170 and/or coverage map database 166 and uses the received information to determine a route from the position of hauling vehicle 10 to the destination while avoiding obstacles. In various embodiments, the destination may include one of harvesting vehicles 20. For example, hauling vehicle 10 may be a hauling vehicle and pathfinding circuit 174 may determine a route to one of harvesting vehicles 20 to unload the harvesting vehicle 20. Path planning is described in detail with reference to FIG. 3B below.

Controller circuit 176 may facilitate control of hauling vehicle 10. For example, controller circuit 176 may receive a route from pathfinding circuit 174 and generate control signals for primary mover 130 to operate hauling vehicle 10. In some embodiments, controller circuit 176 may facilitate autonomous and/or semi-autonomous operation of hauling vehicle 10. Additionally or alternatively, controller circuit 176 may receive information from external sources and operate hauling vehicle 10 based on the received information. For example, controller circuit 176 may receive a route from an external controller (e.g., a cloud-based control system, etc.) and operate hauling vehicle 10 based on the received route.

Coverage map database 166 may store coverage map data. In various embodiments, the coverage map data includes one or more coverage maps. A coverage map may be or include a Cartesian map of a space (e.g., a farm field, etc.). In some embodiments, the coverage maps include one or more waypoints. The waypoints may represent obstacles (e.g., trees, buildings, rocks, etc.). Additionally or alternatively, the waypoints may represent features (e.g., grain drop-off locations, refueling locations, roads, etc.). For example, a coverage map of a rectangular farm field may include four geo-markers (e.g., GPS coordinates, etc.) corresponding to the corners of the rectangular farm field, a number of waypoints representing obstacles in the farm field (e.g., oil well pumps, trees, etc.), and a waypoint representing a grain drop-off location. In some embodiments, the waypoints are labeled according to what they represent (e.g., a waypoint representing a tree is labeled as a tree, etc.). In various embodiments, the coverage map is a data structure configured to be interpreted and represented as a map by a computing circuit. In various embodiments, coverage maps are generated and sent to vehicle control system 110 from external sources. For example, a user may map a farm field, generate a coverage map, and upload the coverage map to coverage map database 166. Additionally or alternatively, vehicle control system 110 may facilitate coverage map creation and/or updating. For example, vehicle control system 110 may generate a coverage map based on object recognition data and/or position data generated by sensor(s) 140. In various embodiments, coverage map database 166 provides coverage map data to object classification circuit 170 and/or pathfinding circuit 174. In some embodiments, coverage maps may include repulsion fields as described in detail below.

Harvesting vehicle 20 is shown to include sensor(s) 22, coverage map database 24, and communication system 26. Sensor(s) 22 may be similar to sensor(s) 140. For example, sensor(s) 22 may include a geolocation sensor (e.g., a GPS receiver, satellite navigation transceiver, etc.) configured to monitor a position of harvesting vehicle 20 (e.g., provide geolocation and/or time information, etc.). Coverage map database 24 may be similar to coverage map database 166. For example, coverage map database 24 may store coverage map data including one or more coverage maps. In various embodiments, harvesting vehicle 20 may update coverage maps stored in coverage map database 24. For example, a first harvesting vehicle 20 (e.g., a combine harvester, etc.) may update (e.g., continuously or periodically, etc.) a coverage map stored in coverage map database 24 to include a path traveled by the first harvesting vehicle 20. In various embodiments, harvesting vehicle 20 may send coverage map data to hauling vehicle 10. For example, harvesting vehicle 20 may send a coverage map to hauling vehicle 10 and hauling vehicle 10 may update a coverage map stored in coverage map database 166 based on the received coverage map.

Communication system 26 may be similar to communication system 150. For example, communication system 26 may facilitate communication between harvesting vehicle 20 and external systems (e.g., hauling vehicle 10, etc.). Communication system 26 may be or include wired or wireless communications interfaces (e.g., jacks, antennas, transmitters, receivers, transceivers, wire terminals, etc.) for conducting data communications within control environment 100 and/or with other external systems or devices.

Figure 2:
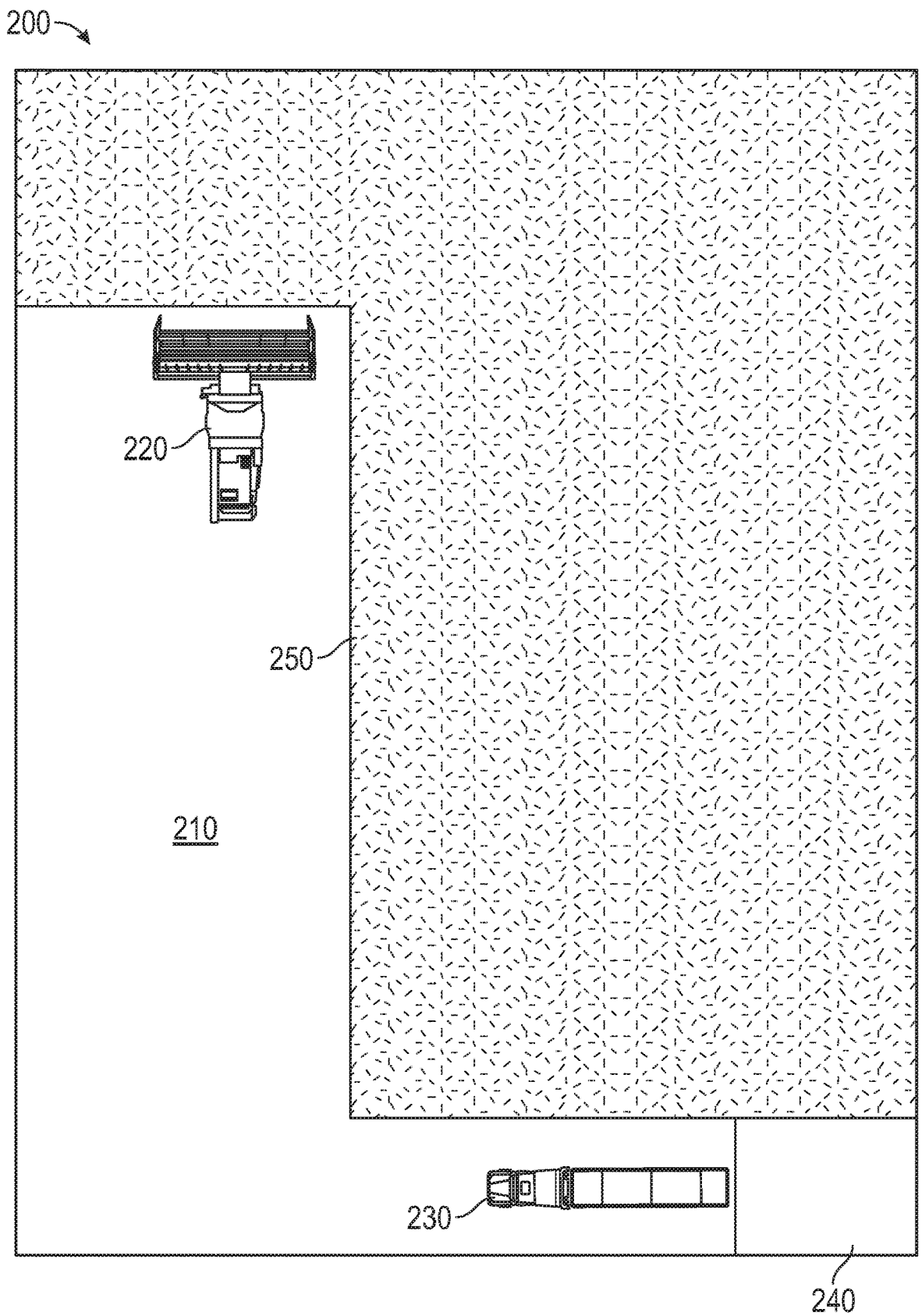
FIG. 2 is a diagram illustrating a vehicle path planning problem, according to an exemplary embodiment.

Referring now to FIG. 2, a diagram illustrating farm field 200 is shown, according to an exemplary embodiment. Farm field 200 includes crop section 250 and non-crop section 210. Crop section 250 may represent an area of farm field 200 where a crop is grown. For example, crop section 250 may represent a section of farm field 200 having corn or soybeans growing. In some embodiments, crop section 250 represents a section of farm field 200 currently having a crop (e.g., a crop is actively planted and/or growing in the section). Additionally or alternatively, crop section 250 may represent a section of farm field 200 designated for crop (e.g., a crop is not currently planted and/or growing in the section but has or will be at some point). Non-crop section 210 may represent an area of farm field 200 that is suitable for vehicles. For example, non-crop section 210 may represent a section of farm field 200 having nothing growing where vehicles may traverse. In various embodiments, non-crop section 210 may include portions of crop section 250 that have been harvested. For example, farm field 200 may include 10 acres of crop section 250 which may be converted into 10 acres of non-crop section 210 when a harvesting vehicle harvests the crop associated with the 10 acres of crop section 250. Farm field 200 is further shown to include drop-off 240. Drop-off 240 may represent a drop-off location for harvested crop. For example, drop-off 240 may include a grain bin.

Farm field 200 is shown to include first vehicle 230 and second vehicle 220. In various embodiments, first vehicle 230 may be hauling vehicle 10 and second vehicle 220 may be one of harvesting vehicles 20. For example, first vehicle 230 may be a hauling vehicle (e.g., a tractor-trailer) and second vehicle 220 may be a harvesting vehicle (e.g., a combine harvester). In various embodiments, first vehicle 230 is paired with second vehicle 220 and configured to service second vehicle 220. For example, first vehicle 230 may be configured to unload harvested grain from second vehicle 220 and transport the harvested grain to drop-off 240. In various embodiments, first vehicle 230 and/or second vehicle 220 are autonomous and/or semi-autonomous vehicles. First vehicle 230 may be required to navigate between second vehicle 220 and drop-off 240 while avoiding obstacles. For example, first vehicle 230 may traverse between second vehicle 220 and drop-off 240 while avoiding crop section 250 (e.g., to avoid damaging crop in crop section 250, etc.) and second vehicle 220 (e.g., to avoid a collision, etc.), as well as any other obstacles in farm field 200 (e.g., rocks, trees, etc.).

Figure 3A:
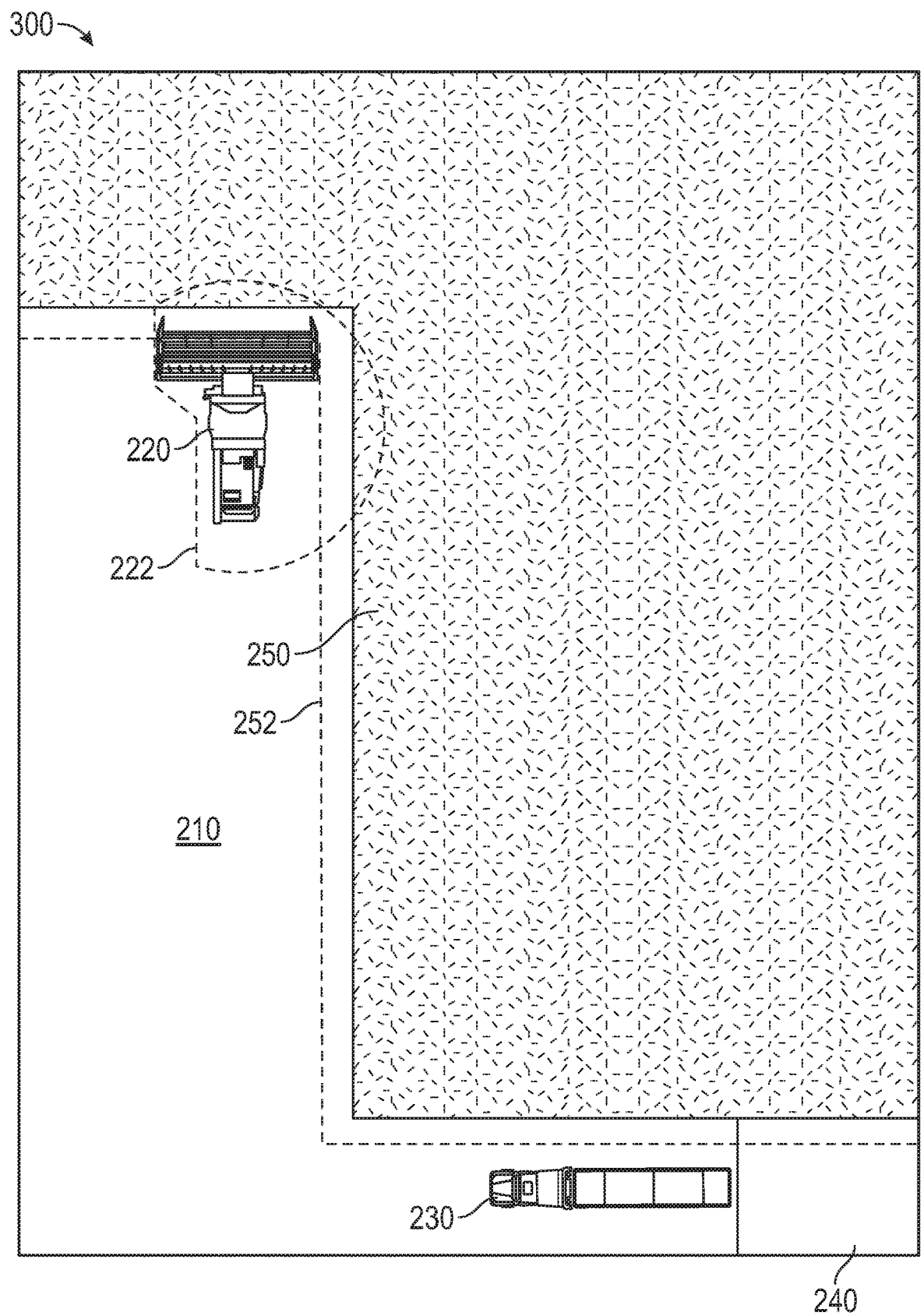
FIG. 3A is the diagram of FIG. 2 including repulsive fields to facilitate obstacle avoidance, according to an exemplary embodiment.
Figure 3B:
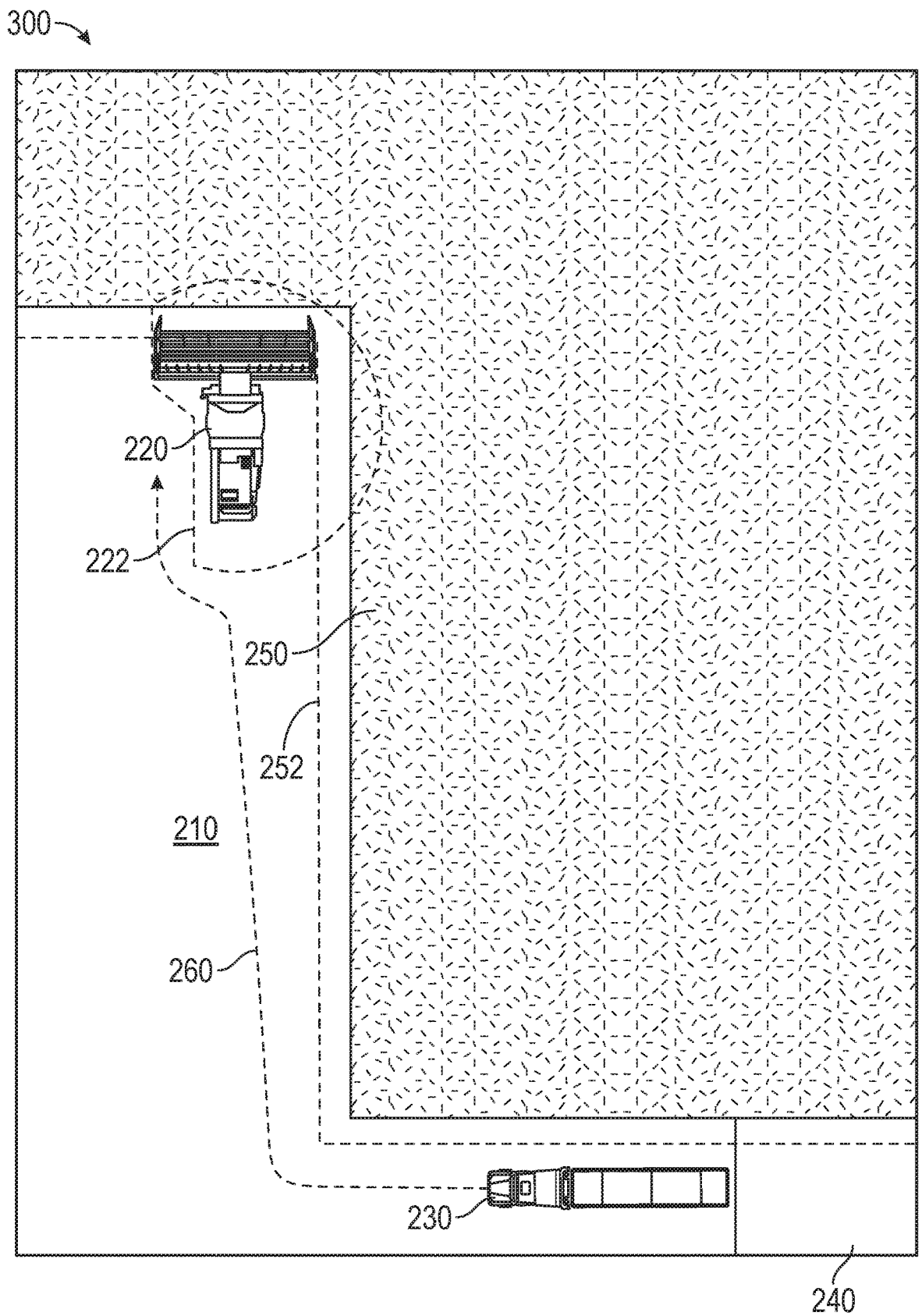
FIG. 3B illustrates an optimal vehicle route given the repulsive fields of FIG. 3A, according to an exemplary embodiment.

Referring now to FIGS. 3A-3B, operation of vehicle control system 110 is described in relation to the farm field of FIG. 2, according to an exemplary embodiment. In brief summary, FIG. 3A illustrates object classification and repulsion field generation and FIG. 3B illustrates path planning. Referring now specifically to FIG. 3A, obstacle model 300 is shown, according to an exemplary embodiment. Obstacle model 300 may be an augmented coverage map. For example, hauling vehicle 10 may receive a coverage map from harvesting vehicle 20 and vehicle control system 110 may generate a number of repulsion fields based on the received coverage map and may store the combined coverage map and repulsion fields as obstacle model 300. Additionally or alternatively, obstacle model 300 may be separate of coverage map data. For example, obstacle model 300 may include repulsion field data but not coverage map data. In various embodiments, vehicle control system 110 generates obstacle model 300. In some embodiments, obstacle model 300 is stored in coverage map database 166. In various embodiments, vehicle control system 110 uses obstacle model 300 to facilitate path planning, as described in detail with reference to FIG. 3B below.

Obstacle model 300 is shown to include dynamic repulsive field 222 and static repulsive field 252. Dynamic repulsive field 222 may be associated with a moving object. For example, dynamic repulsive field 222 may be associated with a vehicle, a person, an animal, and/or the like. Static repulsive field 252 may be associated with a non-moving object. For example, static repulsive field 252 may be associated with crop, a building, a rock, a tree, a culvert, a road, and/or the like. In various embodiments, vehicle control system 110 generates dynamic repulsive field 222 and static repulsive field 252 based on obstacle data (e.g., a coverage map, position data, etc.). In various embodiments, vehicle control system 110 classifies objects based on the obstacle data (e.g., a type or source of the obstacle data, etc.). For example, vehicle control system 110 may receive location data from one of harvesting vehicles 20 and classify the harvesting vehicle 20 as a dynamic obstacle. In various embodiments, vehicle control system 110 identifies portions of farm field 200 that correspond to crop. For example, a coverage map may include geo-markers indicating a portion of farm field 200 corresponding to crop and vehicle control system 110 may represent the portion as crop section 250 based on the geo-markers. Additionally or alternatively, vehicle control system 110 may represent an entire area of farm field 200 as crop section. For example, vehicle control system 110 may receive a coverage map indicating a boundary of farm field 200 and may initially label the entire area within farm field 200 as crop section 250. In various embodiments, vehicle control system 110 updates obstacle model 300 in real time. For example, vehicle control system 110 may receive location data from a harvesting vehicle (e.g., a combine harvester, etc.) indicting a path of the harvesting vehicle and may update obstacle model 300 based on the path by converting portions of crop section 250 that are covered by the harvesting vehicle path into non-crop section 210 (e.g., because they have been harvested and no longer contain crop, etc.). In various embodiments, more than one obstacle may exist in a particular area. For example, obstacle model 300 may include a first obstacle associated with a first static repulsive field 252 corresponding to crop section 250 and may include a second obstacle associated with a second static repulsive field 252 that is within the first static repulsive field 252 and corresponds to a non-moving obstacle such as a rock. To continue the previous example, when a harvesting vehicle harvests the crop corresponding to the first static repulsive field 252, vehicle control system 110 may update obstacle model 300 to remove the first static repulsive field 252 (e.g., because the crop has been harvested) but may maintain the second static repulsive field 252 (e.g., because the rock still exists in that location).

Still referring to FIG. 3A, vehicle control system 110 may update obstacle model 300 based on information received from second vehicle 220. For example, vehicle control system 110 may receive location data from second vehicle 220 and update characteristics (e.g., shape, area, location, etc.) of dynamic repulsive field 222 and static repulsive field 252 based on the location data. As another example, vehicle control system 110 may update a location and orientation of dynamic repulsive field 222 to reflect a location and orientation of second vehicle 220. As another example, vehicle control system 110 may update a size and shape of static repulsive field 252 to reflect the size and shape of unharvested crop in farm field 200. Additionally or alternatively, vehicle control system 110 may adjust characteristics (e.g., shape, area, location, orientation, strength, etc.) of dynamic repulsive field 222 and/or static repulsive field 252 based on context (e.g., environmental conditions that may affect vehicle maneuverability, etc.). As a non-limiting example, if first vehicle 230 is traveling at a relatively high speed, vehicle control system 110 may generate a large dynamic repulsive field 222 for second vehicle 220 to account for the speed of first vehicle 230. Conversely, if first vehicle 230 is traveling at a relatively low speed, vehicle control system 110 may generate a small dynamic repulsive field 222 for second vehicle 220. As a further non-limiting example, vehicle control system 110 may generate larger repulsive fields (e.g., dynamic repulsive field 222 and/or static repulsive field 252) in wet conditions than in dry conditions (e.g., to account for tire slip and/or reduced breaking power, etc.).

In various embodiments, vehicle control system 110 generates repulsive fields based on a type of obstacle. For example, vehicle control system 110 may generate a substantially circular dynamic repulsive field 222 for a combine harvester that includes a concave portion on an unloading side of the combine harvester to facilitate first vehicle 230 to approach the unloading side of the combine harvester for unloading. As a further example, vehicle control system 110 may generate a first static repulsive field 252 for a grain crop that extends 20 feet beyond the border of the grain crop and may generate a second static repulsive field 252 for an apple crop that extends 60 feet beyond the border of the apple crop. In various embodiments, the repulsive fields extend beyond the boundaries of the physical object they are associated with. For example, a static repulsive field 252 associated with a rock may be located centered on the location of the rock but may extend ten times the diameter of the rock out from the edge of the rock. In some embodiments, repulsive fields are standardized. For example, vehicle control system 110 may generate all static repulsive fields 252 as extending 20 feet beyond the boundaries of the physic object they are associated with. As a further example, vehicle control system 110 may generate a dynamic repulsive field 222 having a first shape (e.g., substantially circular, etc.) for all vehicles of a first type (e.g., harvesting vehicles, etc.) and may generate a dynamic repulsive field 222 having a second shape (e.g., substantially rectangular, etc.) for all vehicles of a second type (e.g., hauling vehicles, etc.). In general, repulsive fields as described herein are located in substantially the same location as the object they are associated with.

A non-limiting example embodiment of the creation of obstacle model 300 is as follows. First vehicle 230 having vehicle control system 110 may receive a coverage map of a farm field. For example, a user may upload the coverage map to vehicle control system 110 from a surveying and mapping system. The coverage map may include several geo-markers indicating the boundaries of the farm field and a number of waypoints labeled as rocks. Vehicle control system 110 may generate obstacle model 300 including a single static repulsive field 252 associated with the interior area of the farm field (e.g., associated with the crop in the farm field) as designated by the geo-markers and a number of static repulsive fields 252 associated with the rocks. Vehicle control system 110 may receive location data, coverage map data, and/or identifying information from second vehicle 220 and identify second vehicle 220 as a combine harvester. Vehicle control system 110 may classify second vehicle 220 as a dynamic obstacle (e.g., based on the identifying information, etc.). As second vehicle 220 operates in the farm field, vehicle control system 110 may continue to receive location data, coverage map data, and/or identifying information from second vehicle 220. Based on the received data, vehicle control system 110 may update obstacle model 300. For example, vehicle control system 110 may remove portions of the single static repulsive field 252 associated with the interior area of the farm field based on the location of the second vehicle 220 (e.g., portions of the farm field that have been traversed by second vehicle 220 will no longer be included in the single static repulsive field 252). As a further example, vehicle control system 110 may update obstacle model 300 to include a dynamic repulsive field 222 associated with second vehicle 220 based on location and/or orientation data received from second vehicle 220.

Referring now specifically to FIG. 3B, vehicle control system 110 may generate route 260 based on obstacle model 300. In various embodiments, vehicle control system 110 generates route 260 to avoid entering repulsive fields (e.g., dynamic repulsive field 222 and/or static repulsive field 252). Speaking generally, repulsive fields as described herein may be substantially similar to magnetic fields such that when hauling vehicle 10 is located sufficiently close to a repulsive field, a modeled force repelling hauling vehicle 10 from an object associated with the repulsive field is generated that is similar to the repulsive force between two sufficiently close magnetic poles of the same orientation (e.g., north, south). In various embodiments, the repulsive fields include a gradient. For example, a repulsive field may include a gradient having an outer extent and an inner extent. The inner extent may correspond to the center of the repulsive field and the outer extent may be a distance away from the inner extent (e.g., 20 feet out from the inner extent, etc.). The gradient may include a number of levels between the inner extent and the outer extent. For example, ten discrete levels may exist between the inner extent and the outer extent. Additionally or alternatively, the number of levels may be continuous. Each level may correspond to a modeled repulsive force. For example, an object at a first level corresponding to first distance from the inner extent may experience a first modeled repulsive force and the object at a second level corresponding to a second distance from the inner extent that is farther than the first distance from the inner extent may experience a second modeled repulsive force that is less than the first modeled repulsive force. In various embodiments, the modeled repulsive forces are used to perform path planning. For example, the modeled repulsive forces may be used as an optimization parameter in a path planning algorithm. Repulsive fields are discussed in greater detail with reference to FIGS. 5A-5C below.

Still referring to FIG. 3B, vehicle control system 110 may receive a location of a destination (e.g., another vehicle, a waypoint, etc.) and determine a route to the destination. In various embodiments, vehicle control system 110 determines route 260 in real time. For example, vehicle control system 110 may continuously or periodically (e.g., every 30 seconds, in response to receiving new data, etc.) update route 260. In various embodiments, real time may include near real time (i.e., current, but not precisely as it happens, such as within a threshold timeframe such as 30 seconds, one minute, etc.). In some embodiments, vehicle control system 110 determines the entire route 260 (e.g. from a current location all the way to the destination). Additionally or alternatively, vehicle control system 110 may determine a portion of route 260. For example, vehicle control system 110 may determine the next 10 feet of route 260. In various embodiments, route 260 is a result of a pathfinding operation. For example, vehicle control system 110 may perform a pathfinding operation to determine an instantaneous (e.g., in real time or in near-real time, etc.) steering angle for first vehicle 230 and over time the summation of instantaneous steering angles may trace route 260. As an additional example, first vehicle 230 (e.g., a hauling vehicle, etc.) may traverse a first route towards second vehicle 220 (e.g., a harvesting vehicle, etc.) until first vehicle 230 encounters a repulsive field and may then react to the repulsive field. In various embodiments, vehicle control system 110 is configured to perform a pathfinding operation to determine route 260. For example, vehicle control system 110 may implement a pathfinding algorithm such as Dijkstra's algorithm, A* search algorithm, D* search algorithm, RRT algorithm, and/or the like. In various embodiments, the pathfinding algorithm is a reactive pathfinding algorithm (e.g., determining the route on the fly, in real or near-real time, etc.) rather than a predictive pathfinding algorithm (e.g., determining the entire route in advanced, etc.). In various embodiments, vehicle control system 110 performs the pathfinding operation using one or more repulsive areas (e.g., static repulsive field 252, dynamic repulsive field 222, etc.). For example, vehicle control system 110 may determine a parameter associated with a proximity of hauling vehicle 10 to the one or more repulsive areas and may utilize the parameter in performing the pathfinding operation (e.g., minimize an energy parameter, etc.). As a further example, vehicle control system 110 may generate an energy parameter based on a summation of modeled repulsive forces acting on hauling vehicle 10 and may implement a pathfinding algorithm to determine the shortest possible path from a location of hauling vehicle 10 to a destination that minimizes the energy parameter. In various embodiments, in response to determining route 260, vehicle control system 110 operates hauling vehicle 10 to traverse route 260.

Figure 4A:
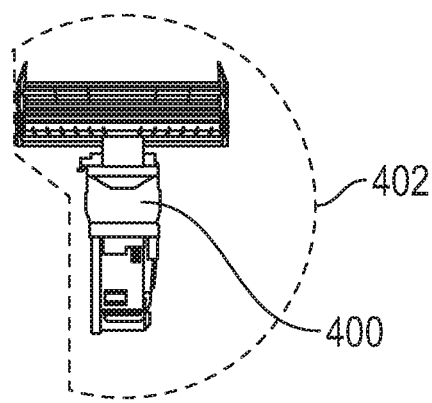
FIG. 4A illustrates a repulsive field for use with a side-unloading vehicle, according to an exemplary embodiment.
Figure 4B:
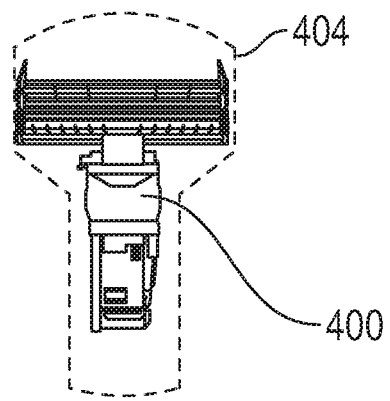
FIG. 4B illustrates another repulsive field for use with a dual side-unloading vehicle, according to an exemplary embodiment.
Figure 4C:
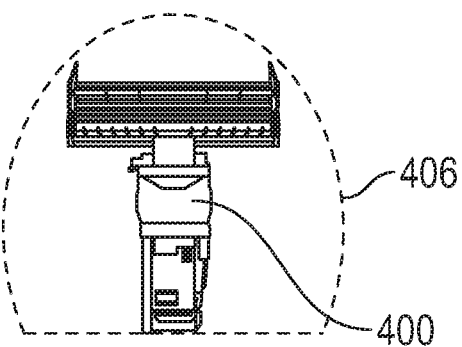
FIG. 4C illustrates another repulsive field for use with a rear-unloading vehicle, according to an exemplary embodiment.

Referring now to FIGS. 4A-4C, various possible embodiments of repulsive fields are shown. It should be understood that while several different configurations of repulsive field characteristics (e.g., shapes, sizes, orientations, etc.) are contemplated, the embodiments expressly disclosed herein are not meant to be limiting and other possible embodiments are within the scope of the present disclosure. The repulsive fields of FIGS. 4A-4C are described in reference to combine harvester 400. However, other vehicles are possible. For example, the repulsive fields may be used with chaser bins (e.g., grain carts, auger wagons, etc.). Referring now specifically to FIG. 4A, first repulsive field 402 is shown, according to an exemplary embodiment. First repulsive field 402 may be associated with a single side-unloading harvesting vehicle. For example, vehicle control system 110 may represent a standard combine harvester for harvesting grain crops. In various embodiments, first repulsive field 402 is a dynamic repulsive field. In various embodiments, first repulsive field 402 includes a portion to facilitate a hauling vehicle. For example, first repulsive field 402 includes a concave portion to facilitate a hauling vehicle on an unloading side of the vehicle (e.g., for a hauling vehicle to approach the vehicle and/or maintain a close distance to the vehicle, etc.).

Referring now specifically to FIG. 4B, second repulsive field 404 is shown, according to an exemplary embodiment. Second repulsive field 404 may be associated with a dual side-unloading harvesting vehicle. Additionally or alternatively, second repulsive field 404 may be associated with a chaser bin (e.g., a dual side-unloading chaser bin, etc.). In various embodiments, second repulsive field 404 is a dynamic repulsive field. In various embodiments, second repulsive field 404 includes a number of portions (e.g., two, etc.) to facilitate a hauling vehicle. For example, second repulsive field 404 includes two concave portions to facilitate a hauling vehicle on either unloading side of the vehicle (e.g., for the hauling vehicle to approach the vehicle and/or maintain a close distance to the vehicle, etc.).

Referring now specifically to FIG. 4C, third repulsive field 406 is shown, according to an exemplary embodiment. Third repulsive field 406 may be associated with a rear-unloading harvesting vehicle. Additionally or alternatively, third repulsive field 406 may be associated with a baler (e.g., a hay baler, etc.). For example, third repulsive field 406 may be associated with a direct baler system (e.g., a baler integrated with a combine harvester, etc.). In various embodiments, third repulsive field 406 is a dynamic repulsive field. In various embodiments, third repulsive field 406 includes a portion to facilitate another vehicle. For example, third repulsive field 406 may include a concave portion near a rear of the harvesting vehicle to facilitate a baler.

Figure 5A:
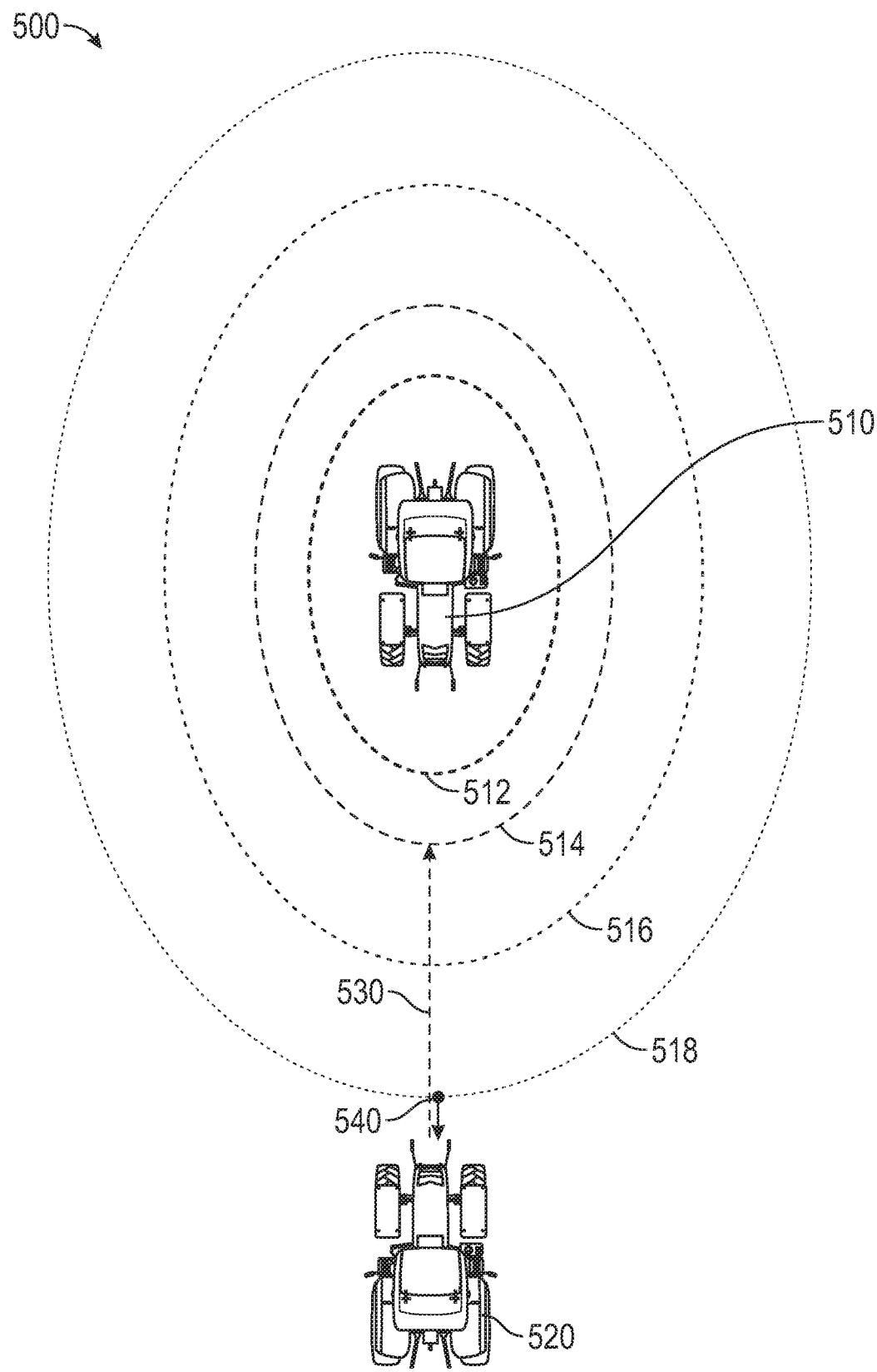
FIG. 5A illustrates an interaction between a vehicle implementing the vehicle control system of FIG. 1 and an obstacle, according to an exemplary embodiment.
Figure 5B:
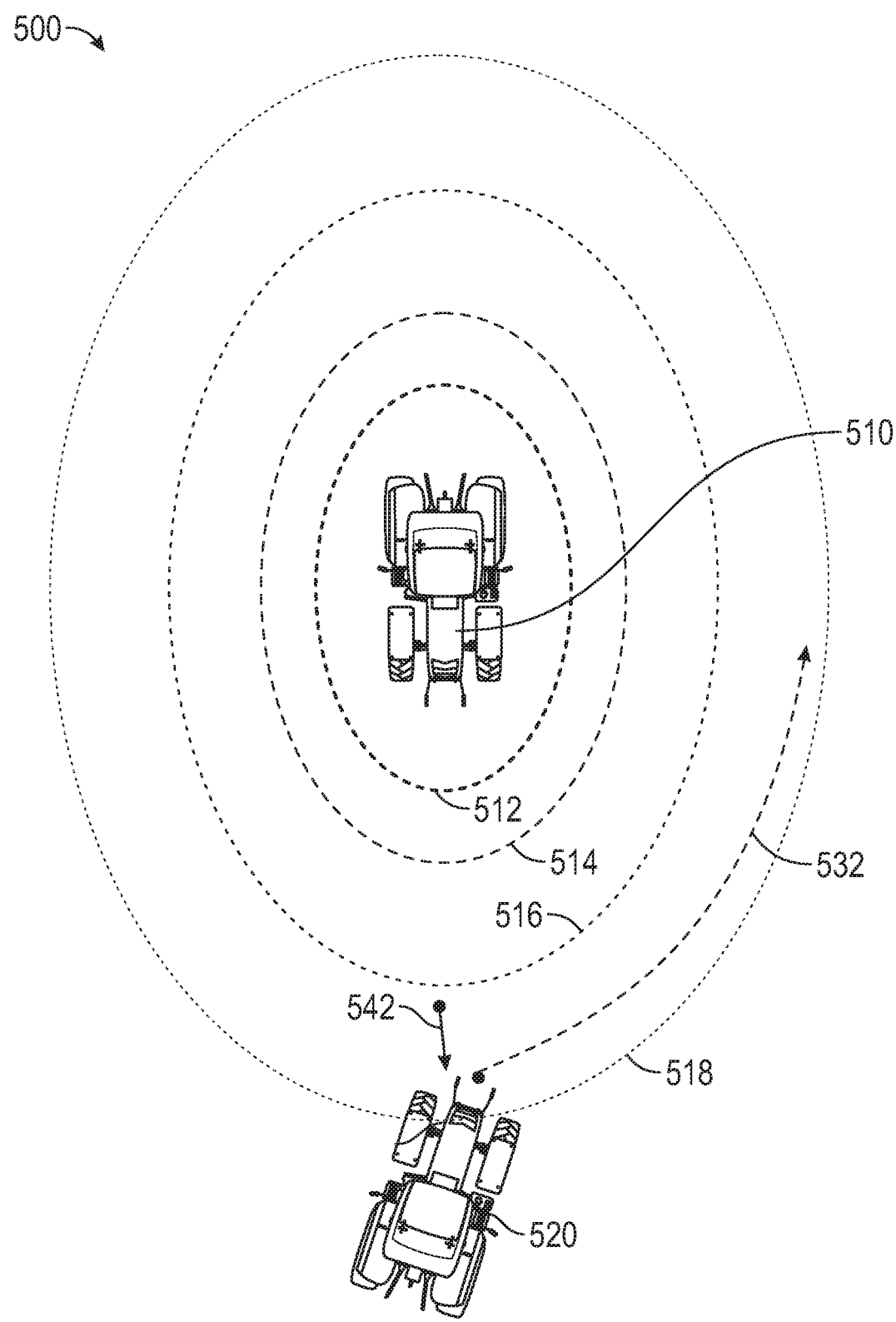
FIG. 5B illustrates an updated path of the vehicle of FIG. 5A, according to an exemplary embodiment.
Figure 5C:
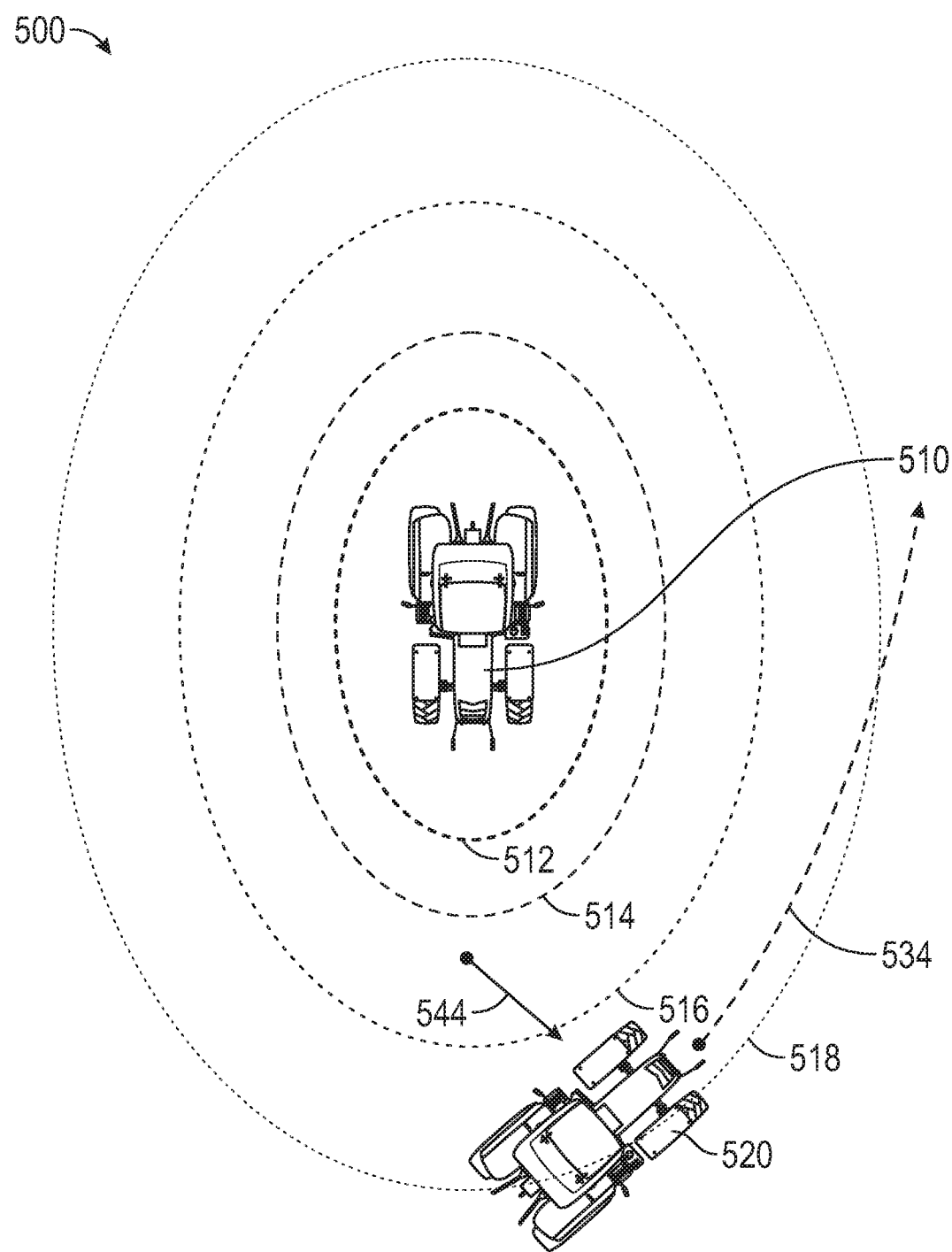
FIG. 5C illustrates another updated path of the vehicle of FIG. 5A, according to an exemplary embodiment.

Referring now to FIGS. 5A-5C, repulsive fields and vehicle path planning are described, according to several exemplary embodiments. In brief summary, vehicle control system 110 may utilize the repulsive fields described herein to perform pathfinding operations. Speaking generally, vehicle control system 110 may determine a shortest possible (e.g., based on a Euclidean distance, etc.) route from a first location to a second location that avoids various repulsive fields. Vehicle control system 110 may model repulsive forces associated with the various repulsive fields and use the repulsive forces in calculating the route. Additionally or alternatively, vehicle control system 110 may model an attractive force between a destination (e.g., one of harvesting vehicles 20, etc.) and hauling vehicle 10. For example, vehicle control system 110 may implement the function:

$$\hat{P} = \hat{a} + \Sigma \hat{r}_i$$

where $\hat{P}$ is a vector path from hauling vehicle 10 to the destination, $\hat{a}$ is an attractive vector between hauling vehicle 10 and the destination, and $\hat{r}_i$ are repulsive vectors associated with the various repulsive fields. Additionally or alternatively, vehicle control system 110 may generate a parameter associated with the various repulsive fields. For example, the parameter may model an energy buildup associated with a proximity of hauling vehicle 10 to the various repulsive fields. For example, vehicle control system 110 may implement the function:

$$E = \Sigma R_i$$

where E is an energy parameter describing a proximity of hauling vehicle 10 to the various repulsive fields and $R_i$ are the repulsive field forces associated with the various repulsive fields. In some embodiments, $R_i$ are scalar values. Additionally or alternatively, $R_i$ may be or include vector values (e.g., directional information, etc.). In various embodiments, vehicle control system 110 may utilize E in computing the route for hauling vehicle 10. For example, vehicle control system 110 may determine the shortest possible route from a location of hauling vehicle 10 to a destination that minimizes the value of E.

Referring now specifically to FIG. 5A, an encounter 500 between primary vehicle 520 and secondary vehicle 510 is shown, according to an exemplary embodiment. In various embodiments, primary vehicle 520 is hauling vehicle 10 and secondary vehicle 510 is one of harvesting vehicles 20. Primary vehicle 520 may be associated with vehicle control system 110. In various embodiments, vehicle control system 110 generates a repulsive field associated with secondary vehicle 510, as described above in reference to FIGS. 2-4C. The repulsive field may include discrete levels 512-518. Additionally or alternatively, the repulsive field may be continuous (e.g., include an infinite number of levels 512-518, etc.). Levels 512-518 may be associated with magnitudes. For example, level 518 may be associated with a first magnitude and level 512 may be associated with a second magnitude that is greater than the first magnitude. In various embodiments, the repulsive field (e.g., levels 512-518) is modeled (e.g., simulated, etc.) by vehicle control system 110 rather than being physically present in space. In various embodiments, primary vehicle 520 traverses route 530. Route 530 may be from a location of primary vehicle 520 to a destination. For example, if primary vehicle 520 is a hauling vehicle, route 530 may be a route from a grain drop-off location to a harvesting vehicle that primary vehicle 520 services (e.g., unloads, etc.). Encounter 500 illustrates vehicle control system 110 adjusting route 530 based on a repulsive field. In various embodiments, route 530 corresponds to a route of primary vehicle 520 before encountering secondary vehicle 510 (e.g., route 530 was determined before an interaction between primary vehicle 520 and levels 512-518, etc.).

In various embodiments, primary vehicle 520 traverses route 530 until primary vehicle 520 encounters a repulsive field (e.g., one of levels 512-518, etc.). Upon encountering the repulsive field, vehicle control system 110 may generate a first repulsive force 540. First repulsive force 540 may be modeled by vehicle control system 110 rather than being physically present in space. In various embodiments, first repulsive force 540 is a vector. For example, first repulsive force 540 may be a vector directed from secondary vehicle 510 to primary vehicle 520 and having a magnitude corresponding to a distance between secondary vehicle 510 and primary vehicle 520. Additionally or alternatively, first repulsive force 540 may be a scalar. In various embodiments, vehicle control system 110 uses first repulsive force 540 in determining and/or updating route 530. For example, vehicle control system 110 may implement the following function:

$$\text{Route} = F(l_i, l_f, O)$$

where Route is route 530, $l_i$ is an initial location (e.g., current location) of primary vehicle 520, $l_f$ is a final location (e.g., destination) of primary vehicle 520, and O is obstacle data. Obstacle data may include $\hat{r}_i$, E, and/or other parameters describing a proximity of primary vehicle 520 to obstacles. For example, O may be, include, or be associated with (e.g., calculated based on) first repulsive force 540. In various embodiments, Route is function independent. For example, Route may be computed using a number of different path-finding algorithms each taking $l_i$, $l_f$, and O as inputs. In some embodiments, Route includes a number of elements (e.g., sections, waypoints, pieces, segments, etc.). Additionally or alternatively, Route may be or include an instantaneous heading of primary vehicle 520. For example, vehicle control system 110 may determine control parameters (e.g., direction, speed, etc.) for primary vehicle 520 in real time, thereby traversing route 530. In various embodiments, in response to determining route 530, vehicle control system 110 may operate primary vehicle 520 to traverse route 530.

Referring now to FIG. 5B, primary vehicle 520 is shown as having traversed a portion of route 530 (shown in FIG. 5A), according to an exemplary embodiment. Specifically, primary vehicle 520 moved from a first location along route 530 to a second location along route 530 that is closer to secondary vehicle 510 than the first location. In various embodiments, vehicle control system updates route 530 to generate second route 532 based on first repulsive force 540 (shown in FIG. 5A). In various embodiments, vehicle control system 110 generates second route 532 to minimize first repulsive force 540. For example, vehicle control system 110 may generate a route (e.g., second route 532, etc.) for primary vehicle 520 that curves around an obstacle (e.g., secondary vehicle 510, etc.) thereby reducing a proximity of primary vehicle 520 to the obstacle and/or a repulsive field associated with the obstacle. Additionally or alternatively, the route may be determined in real time (e.g., rather than being preplanned, etc.). For example, second route 532 may be the result of a number of instantaneous heading determinations generated by vehicle control system 110. In various embodiments, vehicle control system 110 generates second repulsive force 542 based on the new location of primary vehicle 520. Second repulsive force 542 may be greater than first repulsive force 540 based on the increased proximity between primary vehicle 520 and secondary vehicle 510 (e.g., primary vehicle 520 interacts more significantly with the repulsive field associated with secondary vehicle 510). In various embodiments, in response to determining second route 532, vehicle control system 110 may operate primary vehicle 520 to traverse second route 530.

Referring now to FIG. 5C, primary vehicle 520 is shown as having traversed a portion of second route 532 (shown in FIG. 5B), according to an exemplary embodiment. Specifically, primary vehicle 520 moved from a second location along second route 532 to a third location along second route 532 that is closer to secondary vehicle 510 than the second location. In various embodiments, vehicle control system 110 updates second route 532 to generate third route 534 based on second repulsive force 542 (shown in FIG. 5B). In various embodiments, vehicle control system 110 generates third route 534 to minimize second repulsive force 542. In various embodiments, vehicle control system 110 generates third repulsive force 544 based on the new location of primary vehicle 520. Third repulsive force 544 may be greater than first repulsive force 540 and/or second repulsive force 542 based on the increased proximity between primary vehicle 520 and secondary vehicle 510. In various embodiments, vehicle control system 110 uses third repulsive force 544 to generate further routes. In various embodiments, in response to determining third route 534, vehicle control system 110 may operate primary vehicle 520 to traverse third route 534.

Figure 6:
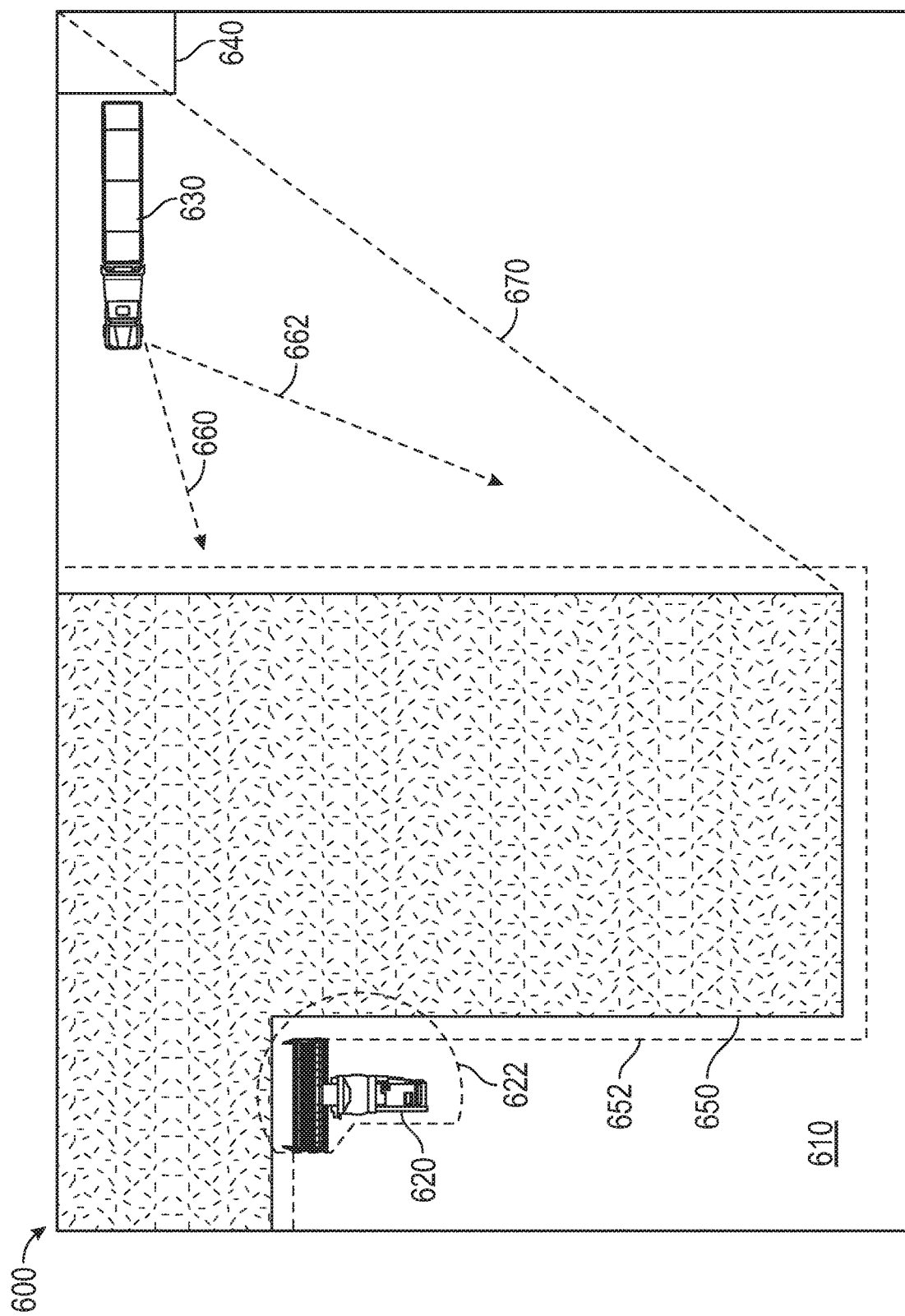
FIG. 6 illustrates an obstacle optimization performed by the vehicle control system of FIG. 1, according to an exemplary embodiment.

Referring now to FIG. 6, vehicle control system 110 may facilitate optimization of repulsive fields. Similarly to FIGS. 2-3B, obstacle model 600 is shown, according to an exemplary embodiment. Obstacle model 600 may include first vehicle 630 and second vehicle 620. In various embodiments, first vehicle 630 may be hauling vehicle 10 and second vehicle 620 may be one of harvesting vehicles 20. First vehicle 630 may be associated with dynamic repulsive field 622 and crop section 650 may be associated with static repulsive field 652. In various embodiments, obstacle model 600 includes non-crop section 610 and drop-off 640. In various embodiments, first vehicle 630 may be required to traverse to a location of second vehicle 620. For example, vehicle control system 110 may generate first route 660 to traverse between a location of first vehicle 630 and a location of second vehicle 620. Additionally or alternatively, vehicle control system 110 may facilitate optimization of repulsive fields. For example, first route 660 may lead to a suboptimal route (e.g., longer in distance than is required) between the location of first vehicle 630 and second vehicle 620 because vehicle control system 110 may not adjust the route until first vehicle 630 encounters static repulsive field 652, which may lead to first vehicle 630 traversing a Manhattan distance instead of a Euclidean distance. In some embodiments, vehicle control system 110 facilitates optimization of repulsive fields by generating repulsive field 670. In various embodiments, repulsive field 670 may be a static repulsive field. In some embodiments, vehicle control system 110 optimizes repulsive fields by converting concave repulsive fields into convex repulsive fields (e.g., determining the smallest possible convex repulsive field that will encapsulate the concave repulsive field, etc.). Additionally or alternatively, vehicle control system 110 may optimize repulsive fields by analyzing obstacle model 600. For example, vehicle control system 110 may determine a test route between first vehicle 630 and second vehicle 620 and generate a repulsive field that steers first vehicle 630 away from an obstacle along the test route. In various embodiments, vehicle control system 110 may generate second route 662 based on repulsive field 670. For example, vehicle control system 110 may generate second route 662 that steers first vehicle 630 around static repulsive field 652 initially instead of waiting until first vehicle 630 encounters static repulsive field 652. In some embodiments, vehicle control system 110 generates repulsive field 670 based on a boarder of obstacle model 600 (e.g., the farm field, etc.).

Figure 7:
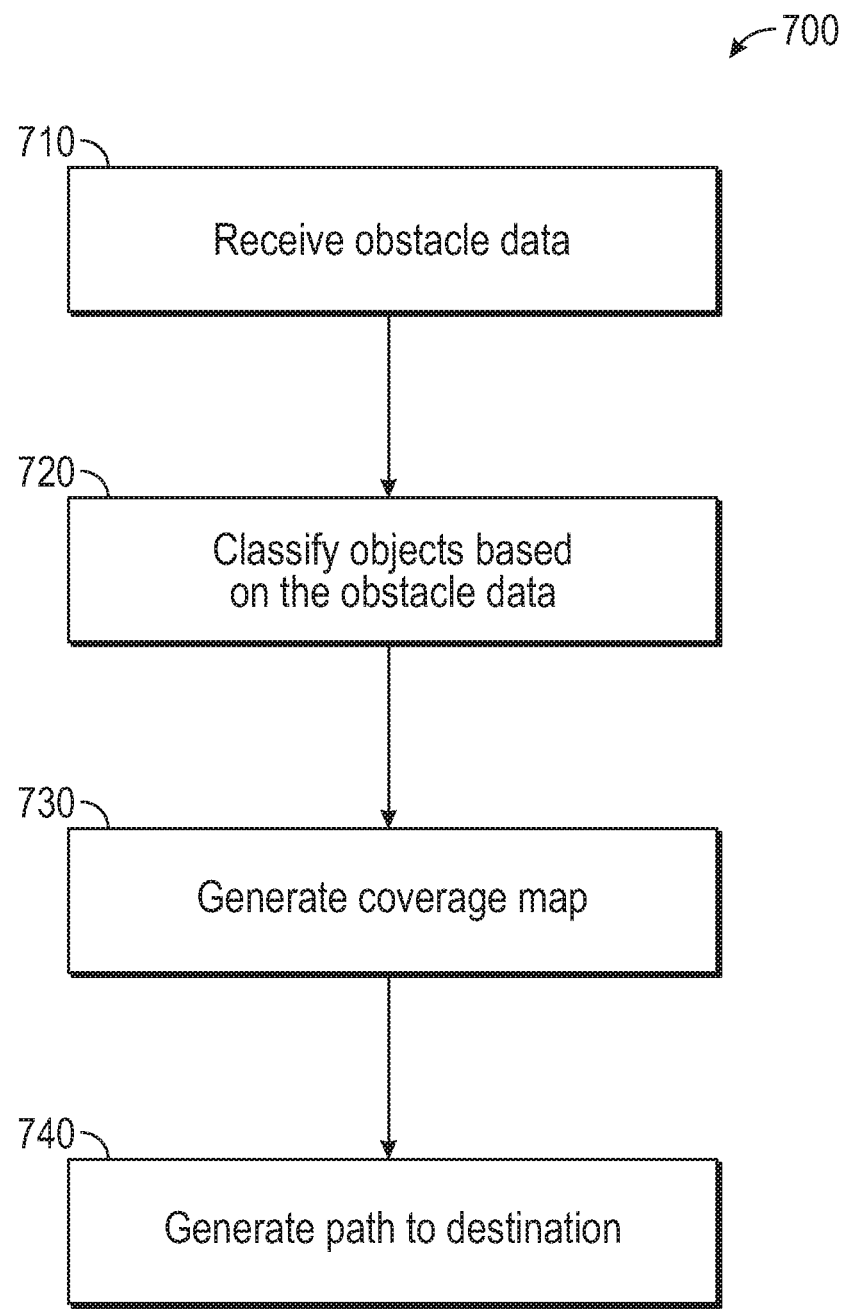
FIG. 7 is a flow diagram of a method of classifying objects and determining vehicle routes, according to an exemplary embodiment.

Referring now to FIG. 7, method 700 for performing pathfinding is shown, according to an exemplary embodiment. In various embodiments, vehicle control system 110 performs method 700. At step 710, vehicle control system 110 receives obstacle data. Obstacle data may include coverage maps, object recognition data, location data (e.g., from harvesting vehicle 20, etc.), and/or the like. In some embodiments, obstacle data is received from external sources. Additionally or alternatively, obstacle data may be generated by hauling vehicle 10. At step 720, vehicle control system 110 classifies objects based on the obstacle data. In various embodiments, vehicle control system 110 classifies objects as static obstacles or dynamic obstacles. For example, vehicle control system 110 may receive a coverage map having a waypoint associated with a rock and classify the waypoint as a static obstacle. As a further example, vehicle control system 110 may receive location data from one of harvesting vehicles 20 and classify the vehicle as a dynamic obstacle. In some embodiments, vehicle control system 110 identifies an object as a particular kind of obstacle. For example, vehicle control system 110 may classify a combine harvester as a left side-unloading vehicle. In some embodiments, vehicle control system 110 determines multiple classifications for a single object.

At step 730, vehicle control system 110 generates a coverage map. In various embodiments, vehicle control system 110 generates a coverage map based on the received obstacle data (e.g., the classified objects, etc.). In various embodiments, the coverage map includes the classified obstacle data. For example, the coverage map may include one or more repulsive fields. In various embodiments, step 730 includes generating repulsive fields. For example, vehicle control system 110 may generate repulsive fields as described in detail above with reference to FIGS. 3A-3B. As a further example, vehicle control system 110 may generate a repulsive field that extends 20 feet beyond the border of an obstacle (e.g., as defined by the coverage map, etc.). In some embodiments, the classified obstacle data is integrated into an existing coverage map. For example, vehicle control system 110 may overlay repulsive fields onto an existing coverage map. Additionally or alternatively, vehicle control system 110 may generate a separate data structure to represent the classified obstacle data. For example, vehicle control system 110 may generate a map including a number of repulsive fields.

At step 740, vehicle control system 110 generates a path to a destination. In various embodiments, vehicle control system 110 generates the path based on the generated coverage map. Additionally or alternatively, vehicle control system 110 may generate the path based on other data (e.g., a map including a number of repulsive fields, etc.). In various embodiments, vehicle control system 110 performs a path planning operation to determine the path. For example, vehicle control system 110 may perform an A* algorithm to minimize an energy parameter associated with a proximity of hauling vehicle 10 to one or more repulsive fields and determine a path having a minimized distance to a destination. In various embodiments, vehicle control system 110 uses one or more repulsive forces generated based on one or more repulsive fields to calculate the path. In some embodiments, in response to generating the path, vehicle control system 110 operates hauling vehicle 10 to traverse the path. For example, vehicle control system 110 may generate control signals to cause operation of primary mover 130. Additionally or alternatively, vehicle control system 110 may send the path information (e.g., the path or information associated with the path, etc.) to other systems. For example, vehicle control system 110 may send the generated path to HMI 120 for display to a user. As another example, vehicle control system 110 may send the generated path to communication system 150 for transmittal to an external decision support system (DSS).

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

What is claimed is:

1. A vehicle control system for an agricultural vehicle, the system comprising:
a processing circuit including a processor and memory, the memory having instructions stored thereon that, when executed by the processor, cause the processing circuit to:
receive a location of a first vehicle;
update a coverage map based on the location of the first vehicle, wherein the coverage map represents a region of operation for the agricultural vehicle and the first vehicle;
designate one or more areas of the coverage map as one or more repulsion fields based on the location of the first vehicle;
generate a path from the agricultural vehicle to a drop-off point based on the one or more repulsion fields; and
operate the agricultural vehicle based on the generated path;
wherein each repulsion field defines a repulsive force generated when the agricultural vehicle enters the repulsion field, wherein the repulsive force is generated based on a proximity between the first vehicle and the agricultural vehicle.

2. The vehicle control system of claim 1, wherein the coverage map includes a path taken by the first vehicle and wherein the one or more repulsion fields are further designated based on the path taken by the first vehicle.

3. The vehicle control system of claim 1, wherein the region of operation is a farm field.

4. The vehicle control system of claim 1, wherein the path is generated to avoid the one or more repulsion fields.

5. The vehicle control system of claim 1, wherein the one or more repulsion fields represent obstacles.

6. The vehicle control system of claim 1, wherein generating the path further includes generating the path based on a location of the agricultural vehicle.

7. The vehicle control system of claim 1, wherein generating the path includes performing an operation with one or more vectors associated with the one or more repulsion fields.

8. The vehicle control system of claim 1, wherein each repulsion field defines a varying modeled force such that an object at a first distance from a center of the repulsion field is subject to a first modeled force and the object at a second distance closer than the first distance from the center of the repulsion field is subject to a second modeled force that is greater than the first modeled force, wherein generating the path further includes performing an operation using the first and second modeled forces.

9. The vehicle control system of claim 8, wherein the operation includes generating a path that attenuates a magnitude of the first and second modeled forces in real time.

10. A non-transitory computer-readable storage medium having instructions stored thereon that, when executed by a processor, cause the processor to:
receive, from a harvesting vehicle, location information;
update a coverage map associated with a haul vehicle that hauls crops harvested by the harvesting vehicle representing a region of operation for the harvesting vehicle based on the location information;
generate one or more repulsion fields based on the updated coverage map, wherein each repulsion field includes a first repulsion field around the harvesting vehicle and a second repulsion field around the harvesting vehicle, wherein the first repulsion field is closer in proximity to the haul vehicle than the second repulsion field, and wherein the haul vehicle in the first repulsion field experiences a first modeled force and wherein the haul vehicle in the second repulsion field experiences a second modeled force that is lower than the first modeled force;
generate a path from the haul vehicle to a drop-off point based on the one or more repulsion fields; and
operate the haul vehicle based on the generated path.

11. The non-transitory computer-readable storage medium of claim 10, wherein generating the path to the drop-off point includes minimizing a parameter associated with the one or more repulsion areas such that the path avoids the one or more repulsion fields.

* * * * *